United States Patent
Farney et al.

(12)

(10) Patent No.: US 6,227,773 B1
(45) Date of Patent: May 8, 2001

(54) COMPACT AUTOFEED DRILL AND ASSOCIATED DRILLING METHOD AND APPARATUS

(75) Inventors: Michael David Farney, Derby; Richard Henry Miller, Rose Hill, both of KS (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/477,136

(22) Filed: Jan. 3, 2000

(51) Int. Cl.$^7$ ..................................................... B23B 35/00
(52) U.S. Cl. .............................. 408/1 R; 408/67; 408/97; 408/124; 408/130; 408/702
(58) Field of Search ................................ 408/1 R, 97, 67, 408/112, 124, 130, 702

(56) References Cited

U.S. PATENT DOCUMENTS

| | | | |
|---|---|---|---|
| 3,010,193 | * 11/1961 | Croall, Jr. et al. ...................... | 29/278 |
| 3,309,945 | * 3/1967 | Halpern ................................ | 408/112 |
| 4,111,208 | * 9/1978 | Leuenberger ....................... | 128/305.1 |
| 4,612,922 | 9/1986 | Barber . | |
| 4,770,570 | 9/1988 | Tsui et al. . | |
| 4,841,817 | 6/1989 | Tsui et al. . | |
| 4,913,600 | * 4/1990 | Dierich et al. ........................ | 408/130 |
| 5,395,187 | 3/1995 | Slesinski et al. . | |
| 5,584,618 | 12/1996 | Blankenship et al. . | |
| 5,630,683 | * 5/1997 | Smith .................................... | 408/67 |
| 5,653,561 | * 8/1997 | May ..................................... | 408/67 |
| 5,738,469 | * 4/1998 | Hsu ...................................... | 408/139 |
| 5,746,551 | * 5/1998 | Skaggs ................................. | 408/112 |
| 5,746,552 | 5/1998 | Tsui et al. . | |
| 5,904,453 | * 5/1999 | Gavia ................................... | 408/67 |

FOREIGN PATENT DOCUMENTS

| | | | |
|---|---|---|---|
| 2942102 | * 4/1981 | (DE) ..................................... | 408/130 |
| 2399297 | * 4/1979 | (FR) ..................................... | 408/97 |

\* cited by examiner

*Primary Examiner*—A. L. Wellington
*Assistant Examiner*—Monica S. Carter
(74) *Attorney, Agent, or Firm*—Alston & Bird LLP (57) ABSTRACT

A compact autofeed drill is provided and generally comprises an elongate housing having opposed ends, a motor disposed within the housing, an elongate drill bit, a drill bushing, an actuation device, and a resilient member. The motor is disposed within the housing intermediate the opposed ends. The drill bit is operably connected to the motor and is capable of extending from the housing through one end thereof. The drill bushing is operably connected to the housing and defines a bore, where the drill bushing at least partially surrounds the drill bit as the drill bit extends from the housing through the bore. The actuation device is remotely disposed with respect to the housing and is operably connected thereto, wherein the actuation device is capable of causing the motor to rotate the drill bit and is also capable of causing the drill bit to extend from the housing. The resilient member is operably connected between the housing and the motor and is capable of retracting the drill bit into the housing upon deactuation of the actuation device. The housing is generally cylindrical and defines a central axis, wherein the axis is substantially perpendicular to the end of the housing through which the drill bit extends. In addition, at least one of the motor and the drill bit may be axially moveable with respect to the housing to facilitate extension of the drill bit from the housing. Generally, the drill is adapted to drill a hole in a workpiece and a portion of the housing is adapted to collect chip swarf produced by the drill bit as the hole is drilled. The actuation device may operate under, for example, pneumatic control or electrical control, wherein the control causes the motor to rotate the drill bit and also causes the drill bit to extend from the housing. An associated drilling method and apparatus are also provided.

16 Claims, 6 Drawing Sheets

COMPACT AUTOFEED DRILL AND ASSOCIATED DRILLING METHOD AND APPARATUS

FIELD OF THE INVENTION

The present invention relates to the production of molded articles and, more particularly, to an apparatus and method for automatically drilling holes in a workpiece molded about a die.

BACKGROUND OF THE INVENTION

The production of molded articles, for example, airplane fuselage components, is typically subject to various limitations. For instance, it is often more convenient to perform some processes on a molded structure after the structure has been formed on a die and remains affixed thereto, than after removing the molded structure from the die. More particularly, for example, holes must often be drilled in the molded structure, wherein the holes are used to align, coordinate, or attach the molded structure to other parts or tools in the manufacturing process. However, drills currently used to perform such a drilling process are typically large and cumbersome, and may be configured such that they are not able to access some areas of the structure or workpiece to drill the required hole. Further, a drill bushing for guiding the drill bit may not be easily incorporated or used in the drilling process, thereby possibly affecting the accuracy of the hole drilled in the workpiece. In addition, some drills must be manually operated, thus requiring the physical positioning of an operator in an awkward or possibly unsafe position to drill the hole in the workpiece.

Generally, two configurations of drills are utilized for drilling holes in a workpiece formed on a die: a manually-operated drill and a manually-operated drill having automatic feed and retraction capabilities. Where a manually-operated drill is used, the drilling process requires an operator to be positioned on or about the die or workpiece to drill the hole in the workpiece, possibly through a pre-positioned drill bushing. The operator may have to climb onto or under a large die and possibly place himself/herself in an unsafe, awkward, or uncomfortable position to perform the drilling procedure. Also, any contact of the operator with the workpiece or die could result in damage to either component. In addition, chip swarf from the drilling process may come into contact with the workpiece and could cause damage thereto, injury to the operator, or damage to other equipment. Further, since the drilling operation is performed manually, many parameters of the drilling operation such as the feed rate of the drill bit, entry into/exit from the workpiece of the drill bit, start/stop of the drill, and chip swarf removal may suffer from lack of consistency. Still further, the removable drill bushing, possibly used in the drilling process to guide the drill bit, is typically prone to inaccurate installation on or about the workpiece as well as to excessive wear from the manual drilling operation. Such limitations of the drill bushing may thereby lead to inconsistently and inaccurately drilled holes. Drills having automatic feed and retraction provisions reduce, for example, the shortcoming of inconsistent drill bit feed rates present with manually-operated drills, but possess many of the same drawbacks as manually-operated drills.

Thus, there exists a need for a drill capable of being applied, with minimal difficulty, to drill holes in workpieces formed on many different configurations and areas of a die used to mold workpieces. Such a drill should be positionable and actuatable with respect to the die to drill the hole without requiring the operator to climb onto or under the die to perform the drilling process, thereby lessening the risk to the operator and the possibility of damage to the workpiece and/or die. The drill should desirably have automatic feed and retraction capabilities and preferably should have a provision for effectively incorporating a drill bushing for guiding the drill bit as the drilling procedure is performed. The drill should also be capable of collecting the chip swarf produced by the drilling process in order to minimize the possibility of injury to the operator and damage to the workpiece or other equipment.

SUMMARY OF THE INVENTION

The above and other needs are met by the present invention which, in one embodiment, provides an autofeed drill generally comprising an elongate housing having opposed ends, a motor disposed within the housing, an elongate drill bit, a drill bushing, an actuation device, and a resilient member. The motor is disposed within the housing intermediate the opposed ends. The drill bit is operably connected to the motor and is capable of extending from the housing through one end thereof. The drill bushing is operably connected to the housing and defines a bore, where the drill bushing at least partially surrounds the drill bit as the drill bit extends from the housing through the bore. The actuation device is remotely disposed with respect to the housing and is operably connected thereto, wherein the actuation device is capable of causing the motor to rotate the drill bit and is also capable of causing the drill bit to extend from the housing. The resilient member is operably connected between the housing and the motor and is capable of retracting the drill bit into the housing upon deactuation of the actuation device. As such, the autofeed drill of the present invention is capable of drilling holes in workpieces while the workpieces remain on a die and the operator is remote from the autofeed drill.

In one advantageous embodiment, the housing is generally cylindrical and defines a central axis, wherein the axis is substantially perpendicular to the end of the housing through which the drill bit extends. In addition, at least one of the motor and the drill bit may be axially moveable with respect to the housing to facilitate extension of the drill bit from the housing. Generally, the drill is adapted to drill a hole in a workpiece and a portion of the housing is adapted to collect chip swarf produced by the drill bit as the hole is drilled. The actuation device may operate under, for example, pneumatic control or electrical control, wherein the control causes the motor to rotate the drill bit and also causes the drill bit to extend from the housing.

Another advantageous aspect of the present invention comprises an apparatus for drilling a hole in a workpiece. Generally, the apparatus comprises a die and a drill including an elongate housing having an engaging end, a motor disposed within the housing, a drill bit operably connected to the motor, an actuation device, and a resilient member. The die has a surface adapted to have the workpiece formed thereon, wherein the drill housing operably engages the die, on the surface opposite the surface on which the workpiece is formed, such that the engaging end does not extend outwardly of the surface of the die. The drill bit is operably connected to the motor and is capable of extending from the housing, and past the surface of the die on which the workpiece is formed, through the engaging end. The actuation device is remotely disposed with respect to the housing and is operably connected thereto, wherein the actuation device is capable of causing the motor to rotate the drill bit and is also capable of causing the drill bit to extend from the housing. The resilient member is operably connected between the housing and the motor and is capable of retracting the drill bit into the housing upon deactuation of the actuation device.

The housing is generally cylindrical and defines a central axis substantially perpendicular to the engaging end of the housing. The housing is operably connected to the die such that the axis of the housing is generally perpendicular to the surface of the die and such that the housing is not capable of rotating about its axis with respect to the die. Typically, either the motor or the drill bit is axially moveable with respect to the housing to facilitate extension of the drill bit from the housing. The apparatus may further include a drill bushing operably connected to the housing and defining a bore, where the drill bushing at least partially surrounds the drill bit as the drill bit extends from the housing through the bore. The drill is adapted to drill a hole in a workpiece and a portion of the housing is adapted to collect chip swarf produced by the drill bit as the hole is drilled. The actuation device may operate by pneumatic or electrical control, wherein the control causes the motor to rotate the drill bit and also causes the drill bit to extend from the housing.

Still a further advantageous aspect of the present invention comprises a method of drilling a hole in a workpiece. An autofeed drill is first attached to a die opposite a surface on which a workpiece is formed, such that the drill does not extend outwardly from the surface. The drill comprises a generally cylindrical housing operably connected to the die such that the axis of the housing is substantially perpendicular thereto, wherein the housing has a motor disposed therein and the motor has a drill bit operably connected thereto. The motor is then actuated to rotate the drill bit, wherein the rotating drill bit is further actuated to extend from the housing and into the workpiece to drill a hole in the workpiece. The chip swarf produced by the drill bit is collected as the hole is drilled. After the hole is drilled, the drill bit is retracted into the housing. Typically, the step of actuating the motor occurs substantially simultaneously with the step of actuating the rotating drill bit. In some instances, the method further includes the step of actuating an actuation device, wherein the actuation device is remotely disposed with respect to the housing and is operably connected thereto, before the step of actuating the motor and the step of actuating the rotating drill bit. The actuation device is capable of causing the motor to rotate the drill bit and also causing the rotating drill bit to extend from the housing. Typically, the actuation device either pneumatically or electrically controls the drill.

Thus, a drill according to embodiments of the present invention is capable of being scaled for various applications and, therefore, may be applied to many different configurations and areas of a die used to mold workpieces. Provisions for installation of the drill within the die, and remote actuation of the drill, allow the drill to be positionable and actuatable with respect to the die without requiring the operator to climb onto or under the die to perform the drilling process. The risk to the operator and the possibility of damage to the workpiece and/or die are thereby lessened. The drill according to embodiments of the present invention further includes automatic feed and retraction capabilities and also incorporates a drill bushing for guiding the drill bit as the drilling procedure is performed. Provisions are also included for collecting the chip swarf produced by the drilling process in order to minimize the possibility of injury to the operator and damage to the workpiece or other equipment.

BRIEF DESCRIPTION OF THE DRAWINGS

Some of the advantages of the present invention having been stated, others will appear as the description proceeds, when considered in conjunction with the accompanying drawings, which are not necessarily drawn to scale, in which.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figures 1, 2A:
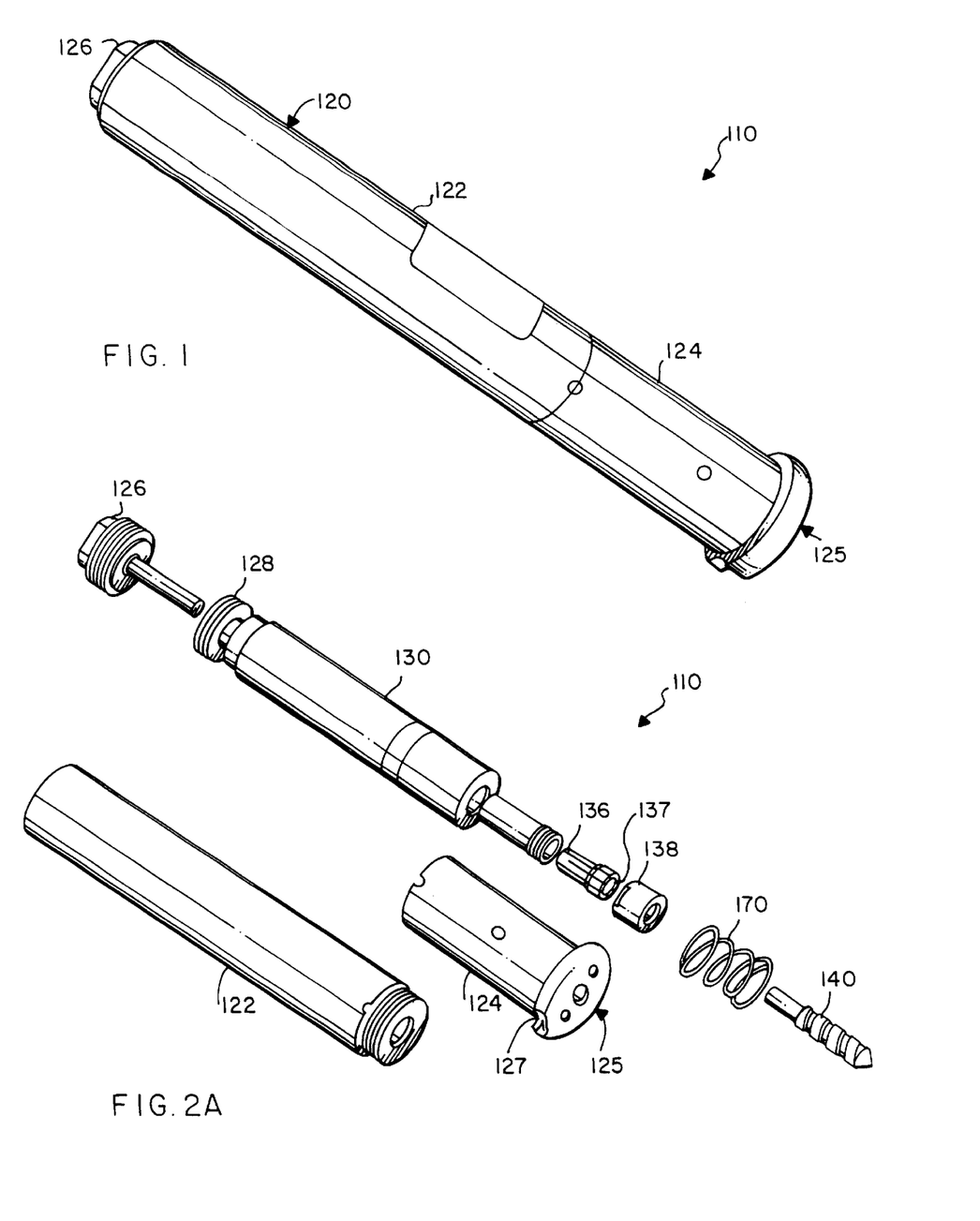
FIG. 1 is a perspective view of a compact autofeed drill according to one embodiment of the present invention.
FIGS. 2A, 2B, and 2C are exploded perspective views of a compact autofeed drill according to one embodiment of the present invention.
Figure 2B:
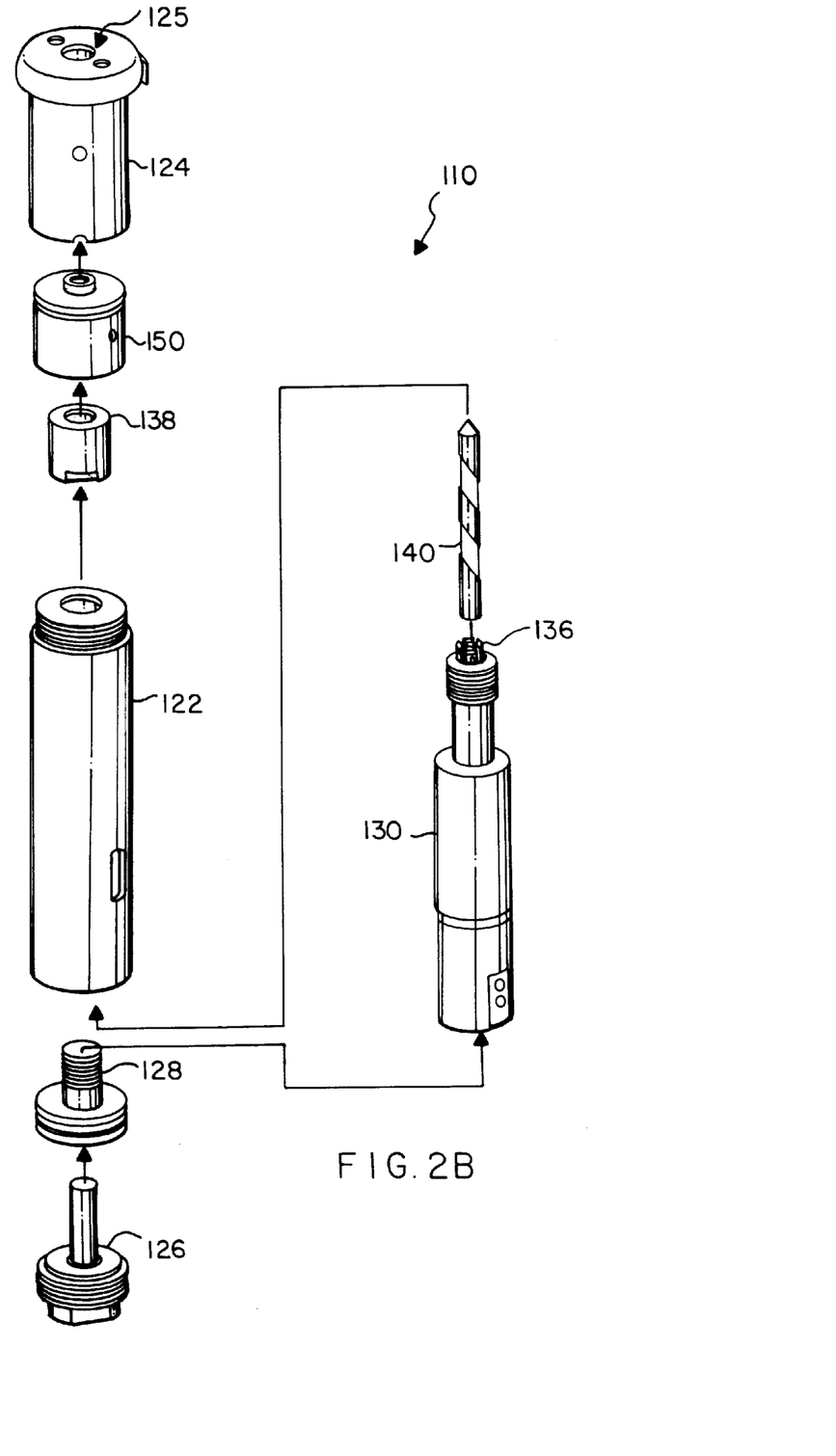
Figure 2C:
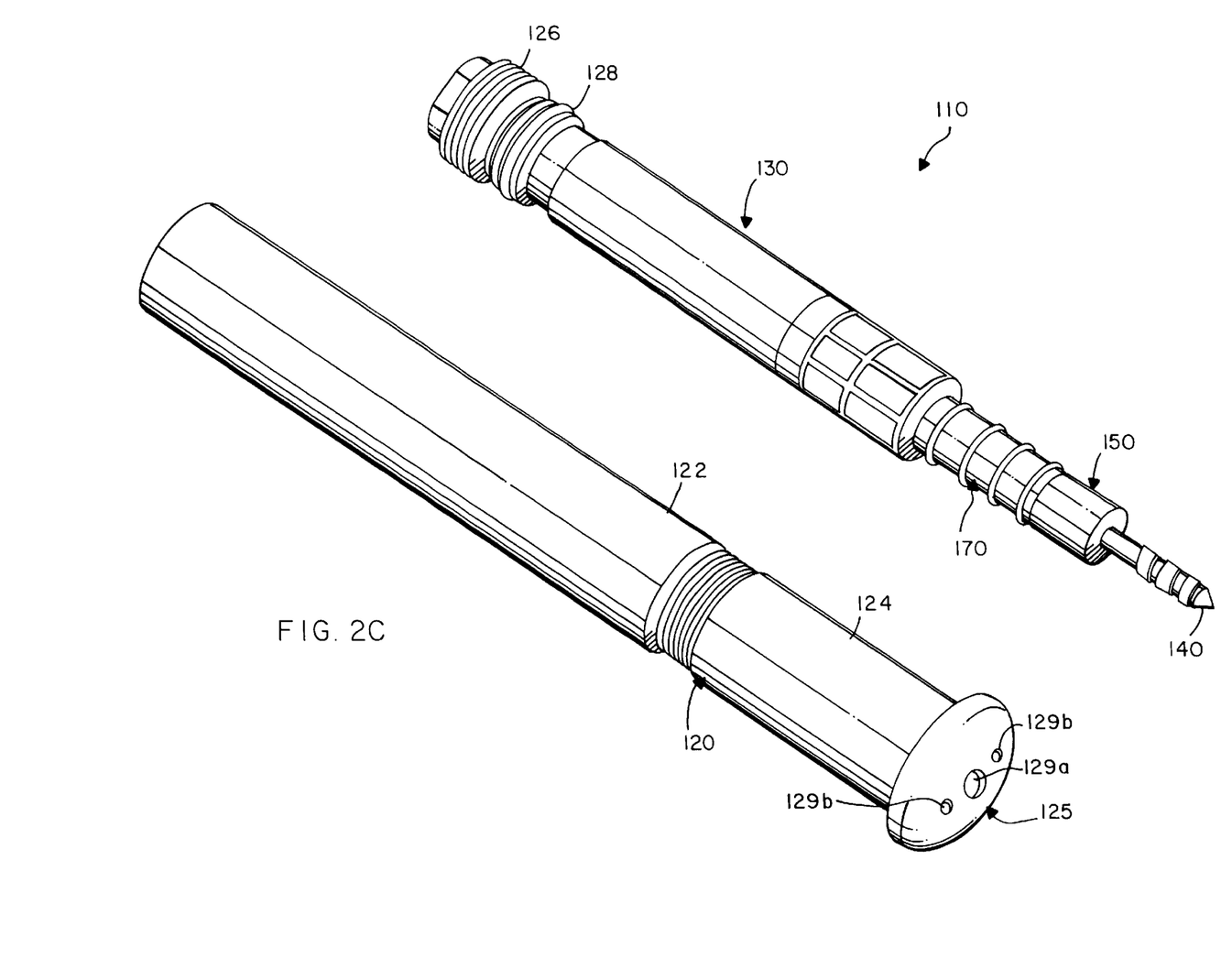
Figure 3:
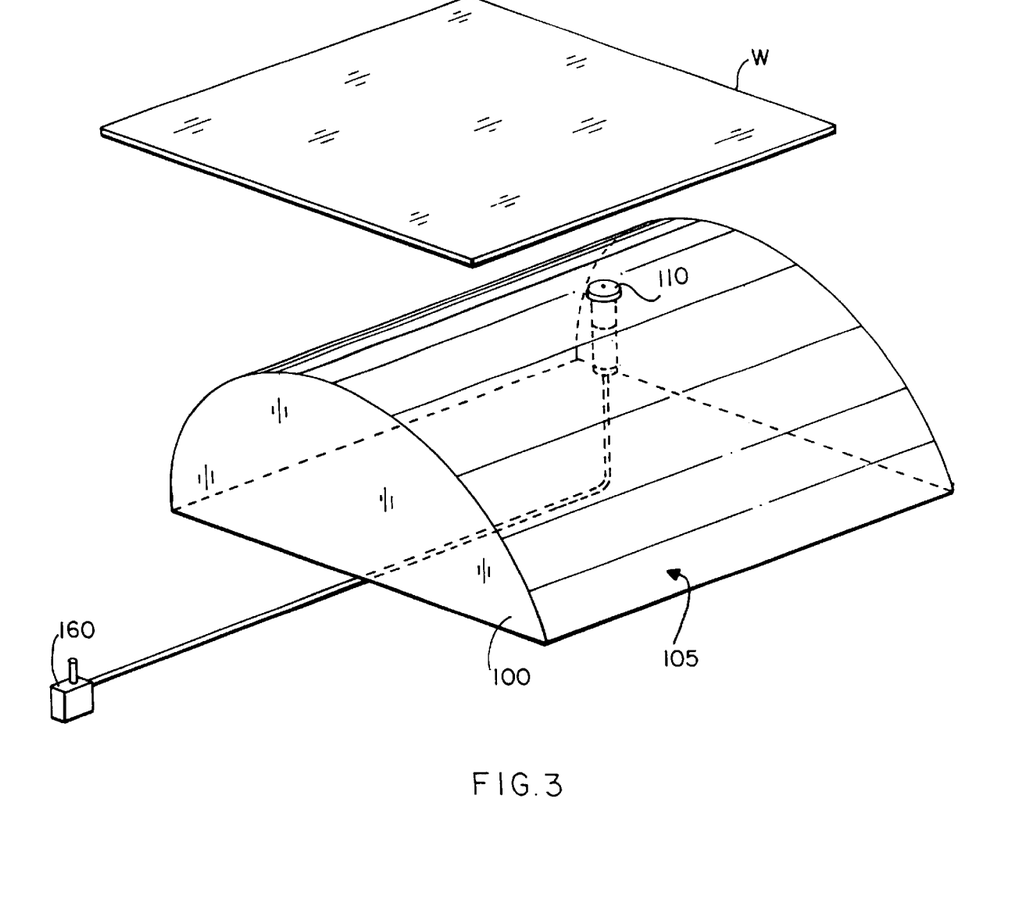
FIG. 3 is a perspective schematic view of a compact autofeed drill according to one embodiment of the present invention having a remote actuator and being installed in a die used for forming a workpiece.

FIGS. 1–3 disclose an embodiment of an autofeed drill for drilling holes in a workpiece formed on a surface of a die in accordance with the present invention, the drill indicated generally by the numeral 110. The drill 110 generally comprises an elongate housing 120, a motor 130, an elongate drill bit 140, a drill bushing 150, an actuation device 160, and a resilient member 170. In a particularly advantageous embodiment, the drill 110 is adapted to be installed in a stretch block, also known as a die 100, on which molded components or workpieces W are formed. Such molded articles may comprise, for example, components of the fuselage of an aircraft. Typically, the drill 110 is installed in the die 100 such that the drill 110 is recessed from the surface 105 of the die 100 on which the component or workpiece W is formed. Preferably, the drill 110 is disposed within the die 100 in a position corresponding to the location of the hole to be drilled in the workpiece W. The drill 110 is also preferably configured such that it is relatively compact in size, readily scalable, and capable of being placed in a variety of orientations within the die 100. Preferably, the drill 110 is easily inserted into and removed from the die 100, wherein the drill 110 is firmly affixed to the die 100 when inserted therein. Generally, the drill 110 is installed in the die 100 such that the axis of the housing 120 is perpendicular to the surface 105 on which the workpiece W is formed. In addition, the drill 110 is installed in the die 100 such that the end 125 of the housing 120 from which the drill bit 140 protrudes does not extend above the surface 105 on which the workpiece W is formed.

According to one embodiment of the present invention, the housing 120 may be formed in separate portions such that the housing 120 comprises a main body 122 and an end casing 124 forming the end 125 of the housing 120 from which the drill bit 140 protrudes. Preferably, the drill bit 140 protrudes axially from the housing 120 through the end 125 of the end casing 124. In some embodiments of the present invention, the main body 122 and the end casing 124 operably engage to form a continuous housing 120 having a tight seal therebetween, wherein the main body 122 and the end casing 124 may be, for example, threadedly engaged.

Disposed within the housing 120 is a drill motor 130 adapted to engage a drill bit 140 and to rotate the drill bit 140 about an axis corresponding to the axis of the housing 120. The drill motor 130 may be, for example, pneumatically or electrically driven. Where, for example, a pneumatic drill motor 130 is used in the drill 100, pressurized air is fed to the drill motor 130. The drill motor 130 is further configured to rotate the drill bit 140 in response to the pressurized air. However, as the drill motor 130 rotates the drill bit 140, the drill bit 140 must also be fed axially out through the end 125 of the housing 120 to drill the hole. Therefore, the drill motor 130 may also be configured such that the pressurized air rotates the drill bit 140 as well as urges the drill motor 130 axially along the interior of the housing 120 to thereby feed the drill bit 140 out through the end 125 of the housing 120. Typically, the drill bit 140 is operably connected to one end of the drill motor 130 by a drill collet 136 cooperating with a drill collet nut 138. The drill collet 136 defines a collapsible longitudinal bore 137 therethrough into which the drill bit 140 is inserted. The drill collet nut 138 is then secured about the drill collet 136 such that the drill collet nut 138 collapses the bore 137 about the drill bit 140 and secures the drill bit 140 to the drill motor 130. In one particularly advantageous embodiment of the present invention, the drill motor 130 is adapted to move axially within the main body 122 of the housing 122 such that the drill bit 140 is axially moveable within the end casing 124 and outwardly of the end 125 thereof.

In order to regulate the movement of the drill motor 130 within the main body 122 of the housing 120, wherein the motion of the drill motor 130 determines the feed rate of the drill bit 140, a resilient device 170 is disposed between the drill motor 130 and the main body 122 of the housing 120. The resilient member 170 may comprise, for example, a coil spring, wherein the resilient member 170 provides an axial force against the drill motor 130 as the pressurized air is applied thereto such that the drill bit 140 is fed from the housing 120 at a predetermined rate. The predetermined feed rate is established by a combination of factors including, for example, the pressure at which the air is delivered to the drill motor 130 and the mechanical characteristics of the resilient member 170. When the supply of pressurized air to the drill motor 130 is discontinued, the resilient member 170 exerts the axial force against the drill motor 130 which forces the drill motor 130 away from the end casing 124, thereby retracting the drill bit 140 back into the end casing 124.

The pneumatic drill motor 130 typically rotates the drill bit 140 using the pressurized air supplied thereto. After the pressurized air is used to rotate the drill bit 140, it is exhausted from the drill motor 130. According to one advantageous embodiment of the invention, the drill motor 130 is further configured such that the air exhausted therefrom after rotating the drill bit 140 is used to move the drill motor 130 axially within the main body 122 of the housing 120. In one embodiment of the present invention, the pressurized air is fed into the main body 122 of the housing 120 through an air supply housing connector 126 disposed at the end of the housing 120 opposite the end casing 124. Disposed between the air supply housing connector 126 and the drill motor 130 is a motor seal 128 that is operably connected to the drill motor 130 and moveable therewith. Preferably, the air supply housing connector 126 is configured to deliver the pressurized air to the drill motor 130 while sealing the main body 122 and interacting with the drill motor 130 and the motor seal 128 to permit both the drill motor 130 and the motor seal 128 to be axially moveable within the main body 122 of the housing 120. In some instances, the motor seal 128 may be configured such that the air exhausted from the drill motor 130 is directed back through the motor seal 128 to pressurize the volume between the air supply housing connector 126 and the motor seal 128 within the main body 122 of the housing 120. The air pressure within the volume defined between the motor seal 128 and the air supply housing connector 126 thereby urges the drill motor 130 axially along the length of the main body 122 of the housing 120. The dimensions of the main body 122 relative to the drill motor 130 and the resilient member 170 may all be adjusted accordingly to obtain, for example, the desired size of the drill 110 and the desired length of travel of the drill motor 130. In some instances, the length of travel of the drill motor 130 determines the distance that the drill bit 140 extends from the housing 120.

According to one embodiment of the present invention, as the drill bit 140 is urged by the drill motor 130 to extend from the housing 120, it is desirable to provide a mechanism for supporting and guiding the drill bit 140 such that the hole in the workpiece W is accurately drilled. Thus, a drill guide 150 comprising, for example, a drill bushing, may be provided. According to one advantageous embodiment, the drill guide 150 is configured to be axially moveable within the end casing 124 while the drill guide 150 also moveably engages the drill collet nut 138 and the drill bit 140. The drill guide 150 may further be provided with seals (not shown) both between the drill guide 150 and the interior of the end casing 124 and between the interior of the drill guide 150 and the drill collet nut 138. The seals prevent air exhausted from the drill motor 130 from escaping through the end 125 of the housing 120. The drill guide 150 further surrounds the drill bit 140 in an axially moveable manner such that the drill guide 150 comprises a drill bushing for guiding the drill bit 140.

Since the drill 110 according to embodiments of the present invention is intended to drill holes in a workpiece W, generally from an undersurface of the workpiece W, the chip swarf produced by the drill bit 140 drilling through the workpiece W should desirably be collected to avoid damage to the workpiece W and/or the drill 110 as well as facilitating disposal of the chip swarf following the drilling process. Thus, according to embodiments of the present invention, the end 125 of the housing is configured to define an orifice 129a through which the drill bit 140 extends as the drill motor 130 is actuated. According to one particularly advantageous embodiment, the orifice 129a is oversized as compared to the size of the drill bit 140 such that the chip swarf produced by the drill bit 140 may fall around the drill bit 140 and through the orifice 129a into the volume defined between the drill guide 150 and the interior of the end casing 124. The end 125 may further define auxiliary orifices 129b disposed about the orifice 129a to further facilitate the chip swarf being collected within the end casing 124.

Figure 2D:
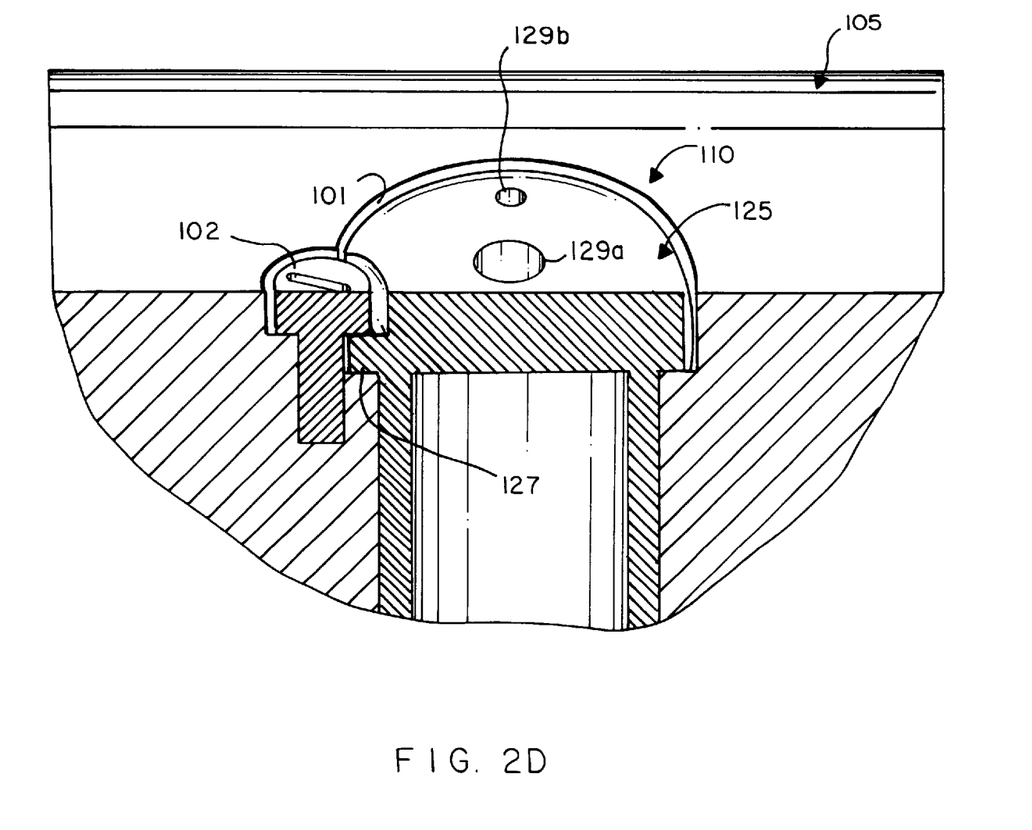
FIG. 2D is a plan view of a compact autofeed drill installed in a die according to one embodiment of the present invention.

Thus, once all the components of the drill 110 have been operably connected, the drill 110 forms an apparatus that is compact and integrally housed in a single substantially cylindrical housing 120. The drill motor 130 is actuated by pressurized air which rotates the drill bit 140 as well as urges the drill motor 130 axially along the housing 120 such that the drill bit 140 is urged outwardly of the housing 120 in an axial direction. As the hole is being drilled in the workpiece W by the drill bit 140, the chip swarf produced by the process is collected within the housing 120, thereby providing a self-contained drilling apparatus. To facilitate the installation of the drill 110 within a die 100, the end 125 of the housing 120 may be configured such that a flange 127 interacts with a key 102 within a hole 101 in the die 100 accommodating the drill 110, the interaction of the flange 127 and key 102 thereby locking the drill 110 in the desired position in the die 100 as shown in FIG. 2D. When installed in the die 100, the interaction of the flange 127 with the key 102 in the die 100 prevents the drill 110 from rotating as well as from moving axially with respect to its installation position in the die 100.

FIG. 3 is a representative schematic of a drill 110 according to embodiments of the present invention installed within a die 100 on which a workpiece W is molded to a desired configuration. As shown, the drill 110 is installed within the die 100 such that the axis of the drill 110 is generally perpendicular to the surface 105 of the die 100 on which the workpiece W is formed. Preferably, when the drill 110 is installed within the die 100, the drill 110 is disposed in a position corresponding to the location of the hole desired to be drilled in the workpiece W to be formed on the die 100. Accordingly, after the workpiece W is formed on the die 100 and the hole in the workpiece W is ready to be drilled, actuation of the drill motor 130 by a pressurized air source actuates the drilling process. In one particularly advantageous embodiment, an actuator 160 is provided, wherein the actuator 160 is operably connected to the drill 110 through the air supply housing connector 126. The actuator 160 thereby controls the supply of pressurized air to the drill motor 130. Accordingly, if the drill motor 130 were electrically operated, the actuator 160 would control the supply of electricity to the drill motor 130. Since the drill 110 is already in the desired position to drill the desired hole in the workpiece W, the actuator 160 is preferably disposed remotely of the die 100 such as, for example, in a remote operator's booth (not shown). An operator is thus able to control the drilling of a hole in the workpiece W remotely of the die 100.

Figure 4:
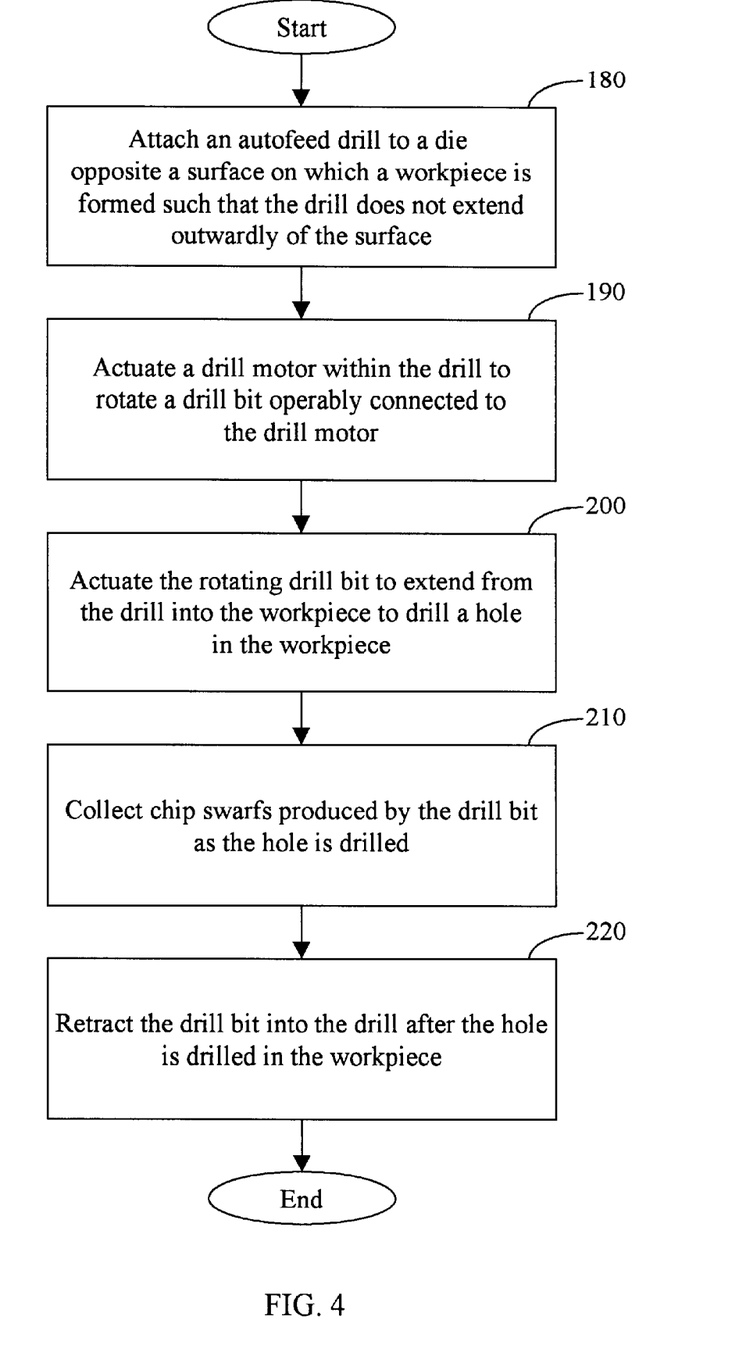
FIG. 4 is a flowchart illustrating a method of drilling a hole in a workpiece according to one embodiment of the present invention.

FIG. 4 discloses a method of drilling a hole in a workpiece formed on a die. First, an autofeed drill is attached to a die opposite a surface on which the workpiece is formed such that the drill does not extend outwardly of the surface and is disposed in a position in which the hole is to be drilled in the workpiece (block 180). The drill generally comprises a cylindrical housing operably connected to the die such that the axis of the housing is substantially perpendicular to the die. According to embodiments of the present invention, the housing has a motor disposed therein, wherein the motor further has a drill bit operably connected thereto. The motor is then actuated to rotate the drill bit (block 190), while the rotating drill bit is further actuated to extend from the housing and into the workpiece to drill a hole in the workpiece in the desired position (block 200). Preferably, the motor and the rotating drill bit are both actuated by an actuation device remotely disposed with respect to the housing and operably connected thereto. The actuation device may further pneumatically control or electrically control the drill. As the hole is being drilled in the workpiece, the chip swarfs produced by the drill bit are collected within the drill (block 210). Once the hole is drilled in the workpiece, the drill bit is retracted into the housing of the drill (block 220).

Thus, a drill according to embodiments of the present invention provides a compact apparatus capable of being applied, with minimal difficulty, to drill holes in a workpiece formed on many different configurations and areas of a die used to mold workpieces in which holes are to be drilled. The drill is preferably installed within the die in a location where a hole is desired to be drilled in a workpiece, prior to the workpiece being formed on the die. Therefore, an operator is not required to climb onto or under the die to perform the drilling process once the workpiece has been formed thereon, thereby lessening the risks to the operator and the possibility of damage to the workpiece and/or the die. Within the compact apparatus, the drill is capable of automatic feed and retraction of the drill bit and incorporates a drill bushing therein for precise guidance of the drill bit as the drilling procedure is performed. The drill, according to embodiments of the present invention, is further configured such that chip swarf produced during the drilling process are collected within the housing of the drill, thereby minimizing the possibility of injury to the operator and damage to the workpiece or other equipment during the drilling process. The drill is further configured to be removable from the die for placement in different locations on the die, for ease of maintenance, and for cleanly and efficiently removing chip swarf from the vicinity of the die and the workpiece. Embodiments of a drill according to the present invention thus provide distinct advantages over prior art processes of drilling holes in a workpiece formed on a die as disclosed herein.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An autofeed drill comprising:
   an elongate housing having opposed ends;
   a motor disposed within the housing intermediate the opposed ends;
   an elongate drill bit operably connected to the motor and capable of extending from the housing through one end;
   a drill bushing operably connected to the housing and defining a bore, the drill bushing at least partially surrounding the drill bit as the drill bit extends from the housing through the bore;
   an actuation device remotely disposed with respect to the housing and operably connected thereto, the actuation device being capable of causing the motor to rotate the drill bit and also being capable of causing the drill bit to extend from the housing; and
   a resilient member operably connected between the housing and the motor, the resilient member capable of retracting the drill bit into the housing upon deactuation of the actuation device.

2. An autofeed drill according to claim 1 wherein the housing is generally cylindrical and defines a central axis, the axis being substantially perpendicular to the end of the housing through which the drill bit extends.

3. An autofeed drill according to claim 1 wherein at least one of the motor and the drill bit is axially movable with respect to the housing to facilitate extension of the drill bit from the housing.

4. An autofeed drill according to claim 1 wherein the drill is adapted to drill a hole in a workpiece and a portion of the housing is adapted to collect chip swarf produced by the drill bit as the hole is drilled.

5. An autofeed drill according to claim 1 wherein the actuation device operates under at least one of a pneumatic control and an electrical control which causes the motor to rotate the drill bit and also causes the drill bit to extend from the housing.

6. An apparatus for drilling a hole in a workpiece, said apparatus comprising:
   a die having a surface adapted to have the workpiece formed thereon;
   an elongate housing having an engaging end, the housing operably connected to the die opposite the surface on which the workpiece is formed such that the engaging end does not extend outwardly from the surface of the die;
   a motor disposed within the housing;
   a drill bit operably connected to the motor and capable of extending from the housing and past the surface of the die through the engaging end;
   an actuation device remotely disposed with respect to the housing and operably connected thereto, the actuation device being capable of causing the motor to rotate the drill bit and also being capable of causing the drill bit to extend from the housing; and
   a resilient member operably connected between the housing and the motor, the resilient member capable of retracting the drill bit into the housing upon deactuation of the actuation device.

7. An apparatus according to claim 6 wherein the housing is generally cylindrical and defines a central axis, the axis being substantially perpendicular to the engaging end of the housing.

8. An apparatus according to claim 7 wherein the housing is operably connected to the die such that the axis is generally perpendicular to the surface of the die and such that the housing is incapable of rotating about the axis with respect to the die.

9. An apparatus according to claim 6 wherein at least one of the motor and the drill bit is axially movable with respect to the housing to facilitate extension of the drill bit from the housing.

10. An apparatus according to claim 6 further including a drill bushing operably connected to the housing and defining a bore, the drill bushing at least partially surrounding the drill bit as the drill bit extends from the housing through the bore.

11. An apparatus according to claim 6 wherein the drill is adapted to drill a hole in a workpiece and a portion of the housing is adapted to collect chip swarf produced by the drill bit as the hole is drilled.

12. An apparatus according to claim 6 wherein the actuation device operates under at least one of a pneumatic control and an electrical control which causes the motor to rotate the drill bit and also causes the drill bit to extend from the housing.

13. A method of drilling a hole in a workpiece comprising:
    attaching an autofeed drill to a die opposite a surface on which a workpiece is formed such that the drill does not extend outwardly from the surface, the drill comprising a generally cylindrical housing operably connected to the die such that the axis of the housing is substantially perpendicular thereto, the housing having a motor disposed therein and the motor having a drill bit operably connected thereto;
    actuating the motor to rotate the drill bit following the attaching step;
    actuating the rotating drill bit to extend from the housing and into the workpiece to drill a hole in the workpiece;
    collecting chip swarf produced by the drill bit as the hole is drilled; and
    retracting the drill bit into the housing after the hole is drilled.

14. A method according to claim 13 wherein the step of actuating the motor occurs substantially simultaneously with the step of actuating the rotating drill bit.

15. A method according to claim 14 further including the step of actuating an actuation device, the actuation device remotely disposed with respect to the housing and operably connected thereto, before the step of actuating the motor and the step of actuating the rotating drill bit, the actuation device capable of causing the motor to rotate the drill bit and also causing the rotating drill bit to extend from the housing.

16. A method according to claim 15 wherein the step of actuating the actuation device further comprises at least one of actuating the actuation device to pneumatically control the drill and actuating the actuation device to electrically control the drill.

* * * * *